(12) United States Patent
Holten et al.

(10) Patent No.: US 10,624,490 B2
(45) Date of Patent: Apr. 21, 2020

(54) CONSUMABLE FOR A DISPENSER AND PROCESSING UNIT FOR A DISPENSER

(71) Applicant: KONINKLIJKE PHILIPS N.V., Eindhoven (NL)

(72) Inventors: Hendrikus Lodewijk Joseph Franciscus Holten, Eindhoven (NL); Jarno Beekman, Eindhoven (NL); Rodin Enne Bruinsma, Eindhoven (NL); Peter Rijskamp, Eindhoven (NL); Jan Klaassen, Eindhoven (NL); Peng Chau Quah, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 389 days.

(21) Appl. No.: 15/514,643

(22) PCT Filed: Sep. 29, 2015

(86) PCT No.: PCT/EP2015/072298
§ 371 (c)(1),
(2) Date: Mar. 27, 2017

(87) PCT Pub. No.: WO2016/050714
PCT Pub. Date: Apr. 7, 2016

(65) Prior Publication Data
US 2017/0258264 A1    Sep. 14, 2017

(30) Foreign Application Priority Data
Sep. 29, 2014    (EP) .................................... 14186724

(51) Int. Cl.
*A47J 31/06* (2006.01)
*A47J 31/40* (2006.01)
(Continued)

(52) U.S. Cl.
CPC ........ *A47J 31/407* (2013.01); *B65D 85/8043* (2013.01)

(58) Field of Classification Search
CPC .... A47J 31/06; A47J 31/0605; A47J 31/0615; A47J 31/0663; A47J 31/0668;
(Continued)

(56) References Cited

U.S. PATENT DOCUMENTS 3,260,190 A    7/1966   Levinson
6,758,130 B2   7/2004   Sargent
(Continued)

FOREIGN PATENT DOCUMENTS

CN    103648340 A    3/2014
DE    10344328 A1    4/2005
(Continued)

OTHER PUBLICATIONS

Office Action issued in connection with corresponding 15770893.4, dated Dec. 22, 2017, 4 pages.
(Continued)

*Primary Examiner* — Hung D Nguyen
(74) *Attorney, Agent, or Firm* — Schott, P.C.

(57) ABSTRACT

The present disclosure relates to a consumable for use in a dispenser for preparation of foodstuff products, the consumable comprising a sealed housing comprising at least one rigid wall portion that is impermeable to liquid, a primary inlet portion arranged to enable pressurized water flow into the housing, a secondary inlet portion arranged to enable an auxiliary fluid flow, particularly an air flow, into the housing, at least one outlet portion arranged to enable the processed foodstuff product to flow out of the housing, at least one containing chamber arranged in the housing, the chamber containing a food substance, particularly a ground substance, at least one flow processing chamber arranged to
(Continued)

process a liquid solution that flows through the flow processing chamber, a flow transfer wall arranged between the containing chamber and the flow processing chamber.

15 Claims, 10 Drawing Sheets

(51) Int. Cl.
*B65D 85/804* (2006.01)
*A47J 31/44* (2006.01)

(58) Field of Classification Search
CPC .. A47J 31/0673; A47J 31/0678; A47J 31/407; A47J 31/4407; A47J 31/446; A47J 31/4492; A47J 31/4496; A47J 31/46; A47J 31/467; A47J 31/56; A47J 31/60; B65D 85/8043; B65D 85/8046
USPC ...... 99/349, 494, 421 V, 416, 418, 415, 419, 99/431, 275–323.2
See application file for complete search history.

(56) References Cited

U.S. PATENT DOCUMENTS

| 8,935,977 B2 | 1/2015 | Noordhuis |
| 2007/0062375 A1* | 3/2007 | Liverani ............ B65D 85/8043 99/279 |
| 2009/0317518 A1* | 12/2009 | York .................. B65D 85/8043 99/295 |
| 2010/0068361 A1* | 3/2010 | Bongers ............ B65D 85/8043 99/295 |

FOREIGN PATENT DOCUMENTS

| EP | 1042978 A1 | 10/2000 |
| EP | 1694180 A1 | 8/2006 |
| EP | 1704803 A1 | 9/2006 |
| EP | 2210826 A1 | 7/2010 |
| EP | 2543291 A1 | 1/2013 |
| JP | 2014-518128 A | 7/2014 |
| RU | 2345694 C2 | 2/2009 |
| WO | 2004084687 A1 | 10/2004 |
| WO | 2008046740 A1 | 4/2008 |
| WO | 2008078991 A1 | 7/2008 |
| WO | 2011010338 A2 | 1/2011 |
| WO | 20111077349 A2 | 6/2011 |
| WO | 2011153272 A2 | 12/2011 |
| WO | 2012100976 A1 | 8/2012 |
| WO | 2013020940 A1 | 2/2013 |
| WO | 2013/114346 A2 | 8/2013 |
| WO | 2013/119538 A1 | 8/2013 |
| WO | 2013004346 A2 | 8/2013 |
| WO | 2014057094 A1 | 4/2014 |

OTHER PUBLICATIONS

Notice of Allowance issued in connection with corresponding 2017-516437, dated Nov. 7, 2018, 5 pages.
Notice of Allowance issued in connection with corresponding 2017115213, dated Jan. 28, 2019, 26 pages.
Office Action issued in connection with corresponding 201580052873. X, dated Mar. 18, 2019, 11 pages.
Office Action issued in connection with corresponding 2015326989, dated Jun. 20, 2019, 4 pages.

* cited by examiner

CONSUMABLE FOR A DISPENSER AND PROCESSING UNIT FOR A DISPENSER

This application is the U.S. National Phase application under 35 U.S.C. § 371 of International Application No. PCT/EP2015/072298, filed on Sep. 29, 2015, which claims the benefit of International Application No. 14186724.2 filed on Sep. 29, 2014. These applications are hereby incorporated by reference herein.

FIELD OF THE INVENTION

The present disclosure relates to the area of appliances (generally referred to as beverage dispensers herein) that prepare a beverage via extraction of food substances through the passage of an extraction fluid, such as hot or cold water, under pressure. The food substance, such as coffee or tea, is contained in consumables that are inserted in these appliances. A beverage may thus generally be coffee, tea, soup, hot or cold chocolate, milk or baby food.

More particularly, the present disclosure relates to consumables (also referred to as capsule or pod) that comprise a plurality of internal chambers that serve different purposes. The present disclosure further relates to a processing unit for a dispenser and to a foodstuff dispenser that may process the aforementioned consumables.

BACKGROUND OF THE INVENTION

A beverage dispensing appliance is known from EP 2 543 291 A1. The document discloses a beverage production machine comprising a brewing head for the production of a beverage, the brewing head comprising a brewing chamber comprising at least two brewing chamber portions movable with respect to each other, a water heater, a hot water duct for feeding hot pressurized water in said brewing chamber from said water heater, a dispensing duct from which said beverage is dispensed, and a structural frame supporting said at least two brewing chamber portions, on which forces generated by the pressurized water in the brewing chamber during brewing are discharged, wherein said structural frame includes said water heater.

DE 103 44 328 A1 discloses a coffee making machine comprising a brewing chamber, the brewing chamber being arranged to receive a filter pad which is filled with ground coffee, wherein the brewing chamber comprises a frothing device for generating a crema, the frothing device comprising a jet opening associated with the brewing chamber and a frothing unit for generating a swirling flow, and wherein the frothing unit is arranged downstream of the jet opening.

WO 2008/078991 A1 discloses a cup for the preparation of a liquid product, comprising an inlet opening provided with a covering layer with liquid-permeable perforations for receiving a liquid suitable for a first preparation substance to be placed in the cup, an outlet opening for discharging the prepared beverage or dish, and a static mixer which is in liquid communication with the outlet opening, in which on the side of the inlet opening the cup is provided with a raised edge on the circumference which extends to a predetermined distance above the covering layer, so that a space for the accommodation of a body filled with a second preparation substance is obtained on the upper side of the cup.

The consumables (also called single-serve units or disposable consumables) currently in use are basically of two types. One type of consumable is generally called a "capsule" and is basically a unit with rigid walls containing the food substance and that has two bases through which the extraction water passes. The capsules are placed into chambers defined by two bodies, one shaped to receive most of the capsule and a closing body which tightly seals the chamber. The water is introduced into the chamber and then traverses the capsule. Thanks to the rigid shape of the capsule, the hydraulic seals of the chamber allow the water to basically traverse the capsule without recirculating the extracted substance through the chamber.

A second type of consumable of a flat shape is generally called a "pod" (or "pad") and may consist of two sections made of thin soft material, cut and paired in order to define a cavity in which the food substance is placed. The material may be for example paper, or a cloth or a non-woven fabric with filtering properties. The two sections are generally circular and are coupled along their outer edges, defining an outer annular flange. The machines which use pods may have two half-shells which are sealed to define a chamber where the pod is placed. Specifically, the annular flange of the pod may be received between the opposite surfaces of the half-shells, defined outside the chamber. Generally, coffee-based pods may be regarded as pre-packaged ground coffee beans in their own filter.

The present disclosure focuses on capsule-type consumables. There is a general need to further improve the flavor, quality and appearance of dispensed foodstuff products, particularly coffee-based or similar beverages. A well-known sign of quality for beverages is the presence of a foamy top layer, which is also known as crema for coffee products. An obtained beverage product that is provided with a crema layer is appreciated by many customers since it at least partially resembles beverage products that can be obtained only from high-priced sophisticated espresso machines and suchlike that are difficult to operate, maintain and clean.

SUMMARY OF THE INVENTION

It is an object of the present invention to provide an alternative approach to the preparation of foodstuff products, particularly beverages, that may be obtained from capsule-based consumables and that can be enriched with tasteful crema layers or foamy layers. Preferably, respective consumables and beverage processing units are provided in the context of the present disclosure that may facilitate the formation of foamy layers and that that sufficiently ensure repeatability of the foam preparation process.

In a first aspect of the present disclosure, a consumable for use in a dispenser for preparation of foodstuff products, particularly a beverage, is presented, the consumable comprising:

a housing comprising at least one rigid wall portion that is impermeable to liquid, a primary inlet portion arranged to enable pressurized water flow into the housing, when the consumable is inserted in the dispenser, a secondary inlet portion arranged to enable an auxiliary fluid flow, particularly an air flow, into the housing, when processing a foodstuff product in the dispenser, at least one outlet portion arranged to enable the processed foodstuff product to flow out of the housing, at least one containing chamber arranged in the housing, the chamber containing a food substance, particularly a ground substance, at least one flow processing chamber arranged to process a liquid solution that flows through the flow processing chamber, the liquid solution being obtained from the food substance, a flow transfer wall arranged between the containing chamber and the flow processing chamber, the flow transfer wall comprising a defined flow opening that connects the flow processing chamber and the containing chamber, wherein the primary inlet portion is connected to the containing chamber, and wherein the secondary inlet portion is connected to the flow processing chamber such that the auxiliary fluid flow is entrained by a liquid foodstuff flow that flows through the flow processing chamber when processing the foodstuff product.

This aspect is based on the insight that the flavor, quality and appearance of the processed foodstuff product perceived by a consumer can be improved by adding a defined "crema" or foam layer to the product. This layer can be formed by inducing small air bubbles to fractions of the product when processing the product. In accordance with the above-presented aspect, the consumable as such may contribute to the creation of a tasteful crema layer. In other words, the consumable may comprise an integrated crema or foam unit. The auxiliary fluid flow may be guided to the flow processing chamber and at least partially entrained by the processed liquid foodstuff flow such that a frothed mixture of liquid and gas bubbles can be generated that may form the crema layer.

As used herein, the term processing a liquid solution may comprise swirling, frothing, atomizing, spraying and/or further techniques to form a mist of the liquid solution obtained from the food substance, wherein the liquid solution may flow against and/or along a wall of the processing chamber and subsequently leaves the processing chamber through the at least one outlet portion in the form of a processed foodstuff product with a fine-bubble foam layer which is also known as a crema layer in the context of coffee-based products.

Generally, the consumable may be referred to as capsule, particularly as disposable capsule. Generally, the flow opening may be referred to as flow nozzle or flow orifice. A flow of pressurized liquid that flows through the consumable may be at least partially deflected, suddenly slowed down and/or sprayed in the flow processing chamber to create the foamy layer. The secondary inlet portion may be arranged at a different end region of the housing than the region where the primary inlet portion is located. In the alternative, the secondary inlet portion may be at the same end region of the housing as the primary inlet portion.

Preferably, the chambers are initially enclosed in the sealed housing in a sealed manner. Hence, the consumable may be sealed which may prolong the "shelf life" of the consumable.

Further, the consumable may comprise a first inlet portion arranged to be ruptured by a water inlet piercing arrangement. A secondary inlet portion may be arranged to be ruptured by a secondary auxiliary input piercing unit to enable a fluid flow, particularly an air flow, into the consumable. An outlet portion may be arranged to be ruptured by an outlet piercing arrangement. Generally, the respective piercing arrangement(s) may be referred to as engagement arrangement(s).

In one embodiment, the foodstuff product is coffee-based, wherein the food substance comprises ground coffee, and wherein the flow processing chamber is arranged to create a foamy crema layer comprising a mixture of a coffee-based liquid and air bubbles. The crema layer may also be referred to as cream layer, foam and/or froth layer. It goes without saying that a consumable within the principles of the present disclosure may be used for beverages that have different tastes and/or flavors.

In another embodiment, the flow processing chamber comprises a frothing cavity that is arranged at an outlet side of the flow transfer wall facing away from the containing chamber, wherein the frothing cavity comprises a wall portion and an outlet that defines a basically annular or circular outlet conduit. The pressurized liquid flow referred to as liquid jet. The liquid jet may enter the frothing cavity through the flow opening. In some embodiments, the wall portion may be arranged as an inner wall portion of the frothing cavity.

In still another embodiment, the flow opening at the flow transfer wall is significantly smaller than the outlet conduit of the frothing cavity, wherein a ratio of an outlet conduit area and a flow opening area is greater than 3:1, preferably greater than 5:1. This may further improve the foam making effect and may ensure a fine "atomization" of the liquid jet, or a least of fractions thereof.

In another embodiment, the flow processing chamber comprises at least one frothing member which is preferably aligned in a direction defined by a central axis of the flow opening, and wherein the at least one frothing member is arranged to process a jet of pressurized liquid foodstuff flow that enters the flow processing chamber through the flow opening to create a mist of the liquid foodstuff. In other words, the liquid jet may impact on the at least one frothing member. This may involve deflecting or spraying the liquid jet by means of the frothing member. In some embodiments, the central axis of the flow opening may be parallel to, preferably aligned or even coincident with, a central axis of a housing that is formed at least in a basically rotationally symmetric fashion. Processing the liquid jet may include swirling, atomizing, spraying and/or frothing the liquid jet.

Beneficial embodiments of frothing members are know from EP 1 694 180 B1 which—however—relates to the implementation of a frothing and/foaming functionality in a machine head of a coffee making device that is configured to process coffee pods, i.e. pre-packaged food substances provided in their own filter.

In another embodiment, the frothing member comprises an impact head that comprises an impact surface facing the flow transfer wall, wherein the impact head is at least partially spaced from a wall portion of the flow processing chamber, thereby defining an at least partially annular outlet conduit. The outlet conduit may be at least substantially annular. At least one side bar or tap may be provided that couples the impact head and a housing portion of the flow processing chamber. The jet of the processed liquid may hit the impact head which may spray at least a considerable fraction thereof. The impact surface may be concavely curved. In the alternative, the impact surface may be convexly curved. Further, the impact surface may be conical. In another embodiment, the impact surface may be basically planar and basically perpendicular to the central axis or at least slightly inclined with respect to the central axis.

In another embodiment, the frothing member comprises a basically annular impact surface arranged between a wall portion of the flow processing chamber and a substantially circular outlet conduit. In still another embodiment, the frothing member is provided by a piercing element that engages the outlet portion. The impact surface may have a basically annular shape and extend basically perpendicular to the central axis and encircle the outlet conduit.

In yet another embodiment of the consumable, a plurality of bosses is arranged at a side of the flow transfer wall that is facing the containing chamber, wherein the food substance in the containing chamber is retained by a filter web that abuts the plurality of bosses such that the pressurized liquid solution is allowed to flow through the filter web and directed to the flow opening of the flow transfer wall. The filter web may be referred to as filter cloth in the alternative. The material for the filter web may be for example paper, a cloth or a non-woven fabric with filtering properties. In some embodiments, a paper-based planar filter element may be provided that separates the food substance from the flow transfer wall.

In another alternative embodiment of the consumable, a circular pattern of ribs is arranged at a side of the flow transfer wall that is facing the containing chamber, wherein the food substance in the containing chamber is retained by a filter web that abuts the pattern of ribs such that the pressurized liquid solution is allowed to flow through the filter web and directed to the flow opening of the flow transfer wall, and wherein the pressurized liquid solution is swirled by the pattern of ribs. The ribs may be generally elongated, particularly extending along an at least slightly curved path that extends in a plane that is basically parallel to the side of the flow transfer wall or perpendicular to the central opening. Preferably, curved ribs are utilized that basically extend from a periphery to a central portion of the flow transfer wall, particularly towards the flow opening. The rib ends may end besides the flow opening, with an offset to or spaced from the flow opening. Due to the desired design and orientation of the ribs, the spiral flow of the liquid solution may be induced in the flow processing chamber. A similar embodiment is known from DE 103 44 328 B4 which however relates to the implementation of a frothing and/or foaming functionality in a machine head of a coffee making device that is configured to process coffee pods.

In yet another embodiment, the flow processing chamber defines a frothing cavity that is aligned with the flow opening of the flow transfer wall, wherein the frothing cavity defines a widening zone and, at an end thereof that faces away from the flow opening, a narrowing zone. The frothing cavity may be shaped in a basically cup-like fashion. The narrowing zone may comprise a funnel-like shape. At least on deflecting rib may be arranged at a confined portion of the narrowing zone. Preferably, an arrangement of two or more deflecting ribs is provided that are generally axially extending and inwardly protruding. The deflecting ribs may deflect and/or stop the induced spiral flow of the liquid solution.

In yet another embodiment of the consumable, the at least one rigid wall portion of the housing is made from metal material or plastic material and shaped in a basically rotationally symmetric fashion defining a first end associated with the primary inlet portion, and a second end associated with the outlet portion. Further, the flow transfer wall may be arranged at the housing, preferably at a center portion of the housing. The flow transfer wall may extend basically perpendicular to a central axis of the housing. In some embodiments, an insert component may be provided that delimits the volume of the flow processing chamber and that is arranged to guide the auxiliary flow to the flow processing chamber. Due to the geometry and size of the insert component, the amount of crema and/or similar bubbly layers can be influenced.

This embodiment may be further developed in that the insert component further defines at least one auxiliary flow path between the secondary inlet portion and the flow processing chamber, wherein the secondary inlet portion is arranged at the housing. Preferably, the secondary inlet portion may be arranged at an edge region of the housing. More particularly, the secondary inlet portion may be provided at an edge region of the second end.

However, at least in some embodiments, the flow processing chamber may be attached or integrally molded to an outer surface of the housing, particularly at the second end thereof. In accordance with these embodiments, the flow transfer wall may delimit the housing of the consumable, wherein the flow processing chamber is coupled thereto to allow the liquid solution obtained in the containing chamber to flow into the flow processing chamber. In accordance with this embodiment, there is no absolute need for the insert component.

Preferably, the flow transfer wall is a separately molded plastic component that is arranged in the housing, particularly the center portion of the housing. In the alternative, the flow transfer wall may form a boundary surface of the housing. Generally, the flow transfer wall may be obtained from a standard two plate tooling, i.e. without the need to provide additional slides. Also the insert component may be a separately molded plastic component. The at least one rigid wall portion may be obtained from thin-walled plastic materials or metal materials, such as aluminum sheets.

At least two consumables may define a set of consumables comprising at least two consumables for use in a beverage dispenser for preparation of a beverage. It is preferred that at least one of the consumable is formed in accordance with at least some aspects of the present disclosure.

In another aspect of the present disclosure, a processing unit for a dispenser for preparation of foodstuff products is presented, the processing unit comprising:

at least a first receiving portion for receiving a consumable, at least a first sealing portion that cooperates with the at least one first receiving portion to receive the consumable in an at least partially sealed manner, wherein at least one of the first receiving portion and the first sealing portion is actuable to insert and remove the consumable, a primary inlet engagement unit that is coupled to an inlet conduit through which pressurized water can be provided, wherein the primary inlet engagement unit is operable to engage a primary inlet portion of the consumable to process a foodstuff product in the consumable, an outlet engagement unit that is operable to engage an outlet portion of the consumable to enable the processed foodstuff product to flow out of the housing, a secondary inlet engagement unit that is operable to engage a secondary inlet portion of the consumable to enable an auxiliary fluid flow, particularly an air flow, into the consumable when processing the foodstuff product, wherein the auxiliary fluid flow is entrained by a liquid foodstuff flow that flows through a flow processing chamber of the consumable when processing the foodstuff product.

At least one of the primary inlet engagement unit, the outlet engagement unit and the secondary inlet engagement unit may be arranged as a piercing unit. Consequently, at least in some embodiments, respective primary inlet piercing units, outlet piercing units and/or secondary inlet engagement piercing units may be provided that may rupture the consumable to access the respective chambers.

However, in the alternative, at least one of the transfer portions (primary inlet portion, outlet portion and/or secondary inlet portion) of the consumable may be engaged and/or connected without an actuable piercing unit. In some embodiments, at least one transfer portion may comprise a manually releasable seal. In some embodiments, at least one transfer portion may comprise a meltable or fusible material that can be fluidized and removed by applying a hot fluid thereto, particularly hot water and/or a hot foodstuff product. In some embodiments, at least one transfer portion may be arranged to cooperate with a basically fixed piercing element of the processing unit when the consumable swells in the course of being supplied with hot pressurized water. In some embodiments, at least one transfer portion may comprise a weakened portion, particularly a thinned portion, that may be ruptured when the consumable is pressurized by applying a pressurized liquid thereto in the course of preparing the foodstuff product.

In some embodiments, the outlet portion and/or the secondary inlet portion of a consumable that is adapted to be processed in the processing unit may already comprise at least one outlet opening and/or at least one secondary inlet opening that do not need to be activated by the processing unit. Hence, the respective engagement units may be coupled thereto without being actuated. Basically the same may apply to a primary inlet opening that may be manually released by a user before the consumable is inserted in the processing unit and eventually consumed.

Preferably, consumables in accordance with at least some embodiments disclosed herein can be processed in the processing unit. Generally, the engagement or piercing units may engage the respective counter-portions by rupturing the housing of the consumable. The auxiliary fluid flow may be provided via a vent hole or vent conduit, i.e. the auxiliary fluid flow may be composed of air that is basically at ambient pressure. However, at least in some embodiments, an at least slightly pressurized auxiliary fluid flow may be delivered to the consumable.

In some embodiments, the secondary inlet unit may be provided in combination with the primary inlet engagement unit or the secondary inlet engagement unit. In the alternative, the secondary inlet engagement unit may be a separate and distinct component.

In one embodiment of the processing unit, at least one of the primary inlet engagement unit and the outlet engagement unit comprises a piercer that is provided with an internal conduit through which a fluid flow may be transferred. Basically the same may apply to at least one piercer of the secondary inlet engagement unit.

In a further embodiment of the processing unit, the secondary inlet engagement unit is selectively actuable to enable the auxiliary fluid flow into the consumable. This may have the advantage that the auxiliary fluid flow can be activated on purpose only in cases when the formation of a crema layer or a similar foamy layer is desired.

In still another aspect of the present invention, a dispensing appliance for preparation of foodstuff products, particularly a beverage dispenser, is presented, the dispensing appliance comprising:
    a water tank,
    a pump unit for pressurizing water supplied from the water tank,
    a heating unit for heating pressurized water, and
    a processing unit in accordance with at least some aspects described herein.

Preferably, the dispensing appliance is arranged to process consumables in accordance with at least some embodiments herein. Needless to say, the dispensing appliance may be arranged to prepare different types of foodstuff products that can be obtained from different types of consumables. Hence, the dispensing appliance may be arranged to process conventional single-chamber capsules as well. The heating unit may be arranged as a flow-through heater, a boiler or a similar heating device. Further, the dispensing appliance may be basically configured to process pre-heated water conducted thereto from an external heating unit. Basically, the heating unit may be arranged downstream of the pump unit. In the alternative, the pump unit may be arranged downstream of the heating unit.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
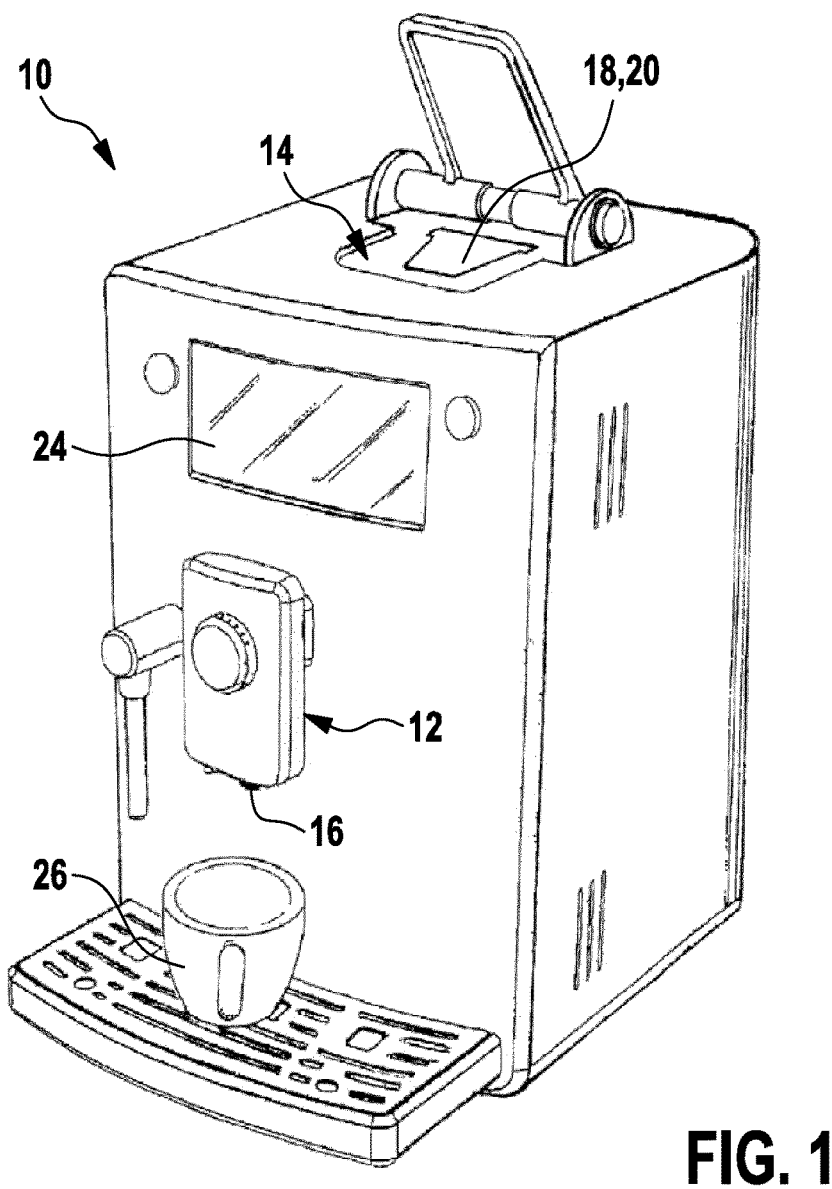
FIG. 1 shows a perspective view of an embodiment of a beverage dispenser, particularly a coffee making appliance.

FIG. 1 shows a perspective view of a dispenser 10, which may be also referred to as coffee making appliance hereinafter. The dispenser 10 may generally, together with consumables 30 (refer also to FIG. 2), form a beverage preparation system. Typically, the dispenser 10 uses capsules as consumables 30. Capsule-based consumables 30 may be referred to as rigid consumables 30 and have the major advantage over soft pad based consumables that they can seal a foodstuff product and its flavor for a considerably long time. In some embodiments the beverage dispenser 10 is configured to be used for making other beverages than coffee, e.g. tea, hot or cold milk, soup, baby food, etc. Further, the consumables 30 generally contain a corresponding food substance for the preparation of the respective beverage by use of the beverage dispenser.

With respect to the dispenser 10, particular reference is made to EP 2 543 291 A1. Further reference in this respect is made to WO 2011/077349 A2.

The dispenser 10 may comprise a dispensing head 12 from which a processed product, particularly a processed beverage, may be obtained. The dispensing head 12 may comprise an outlet portion 16 including an outlet duct to fill a container or cup 26 with the foodstuff product. The dispenser 10 may further comprise a processing unit 14 which will be described further below in more detail. The processing unit 14 may be configured to receive and process consumables 30, particularly capsules containing food substances, such as ground coffee-based products. By way of example, the processing unit 14 may comprise a receiving portion 18 and a sealing portion 20 for receiving and sealing a to-be-processed consumable 30. Furthermore, user controls 24 may be provided that may comprise a display, a touchscreen, switches, control buttons, etc.

Figure 2:
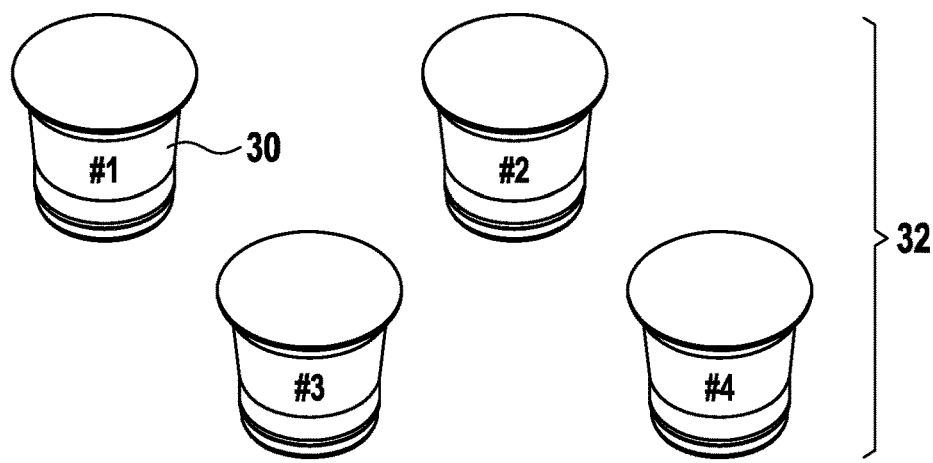
FIG. 2 shows an illustrative perspective top view a set of consumables, particularly capsules, which can be used in dispensing appliances.

FIG. 2 is a perspective top view of an exemplary set 32 of capsules 30. The set 32 of capsules 30 may comprise at least two consumables 30. By way of example, the set 32 of capsules 30 may comprise a plurality of consumables 30 of the same type of flavor. Further, the set 32 of capsules 30 may comprise a plurality of consumables 30 at least some of which represent different flavors.

Figure 3:
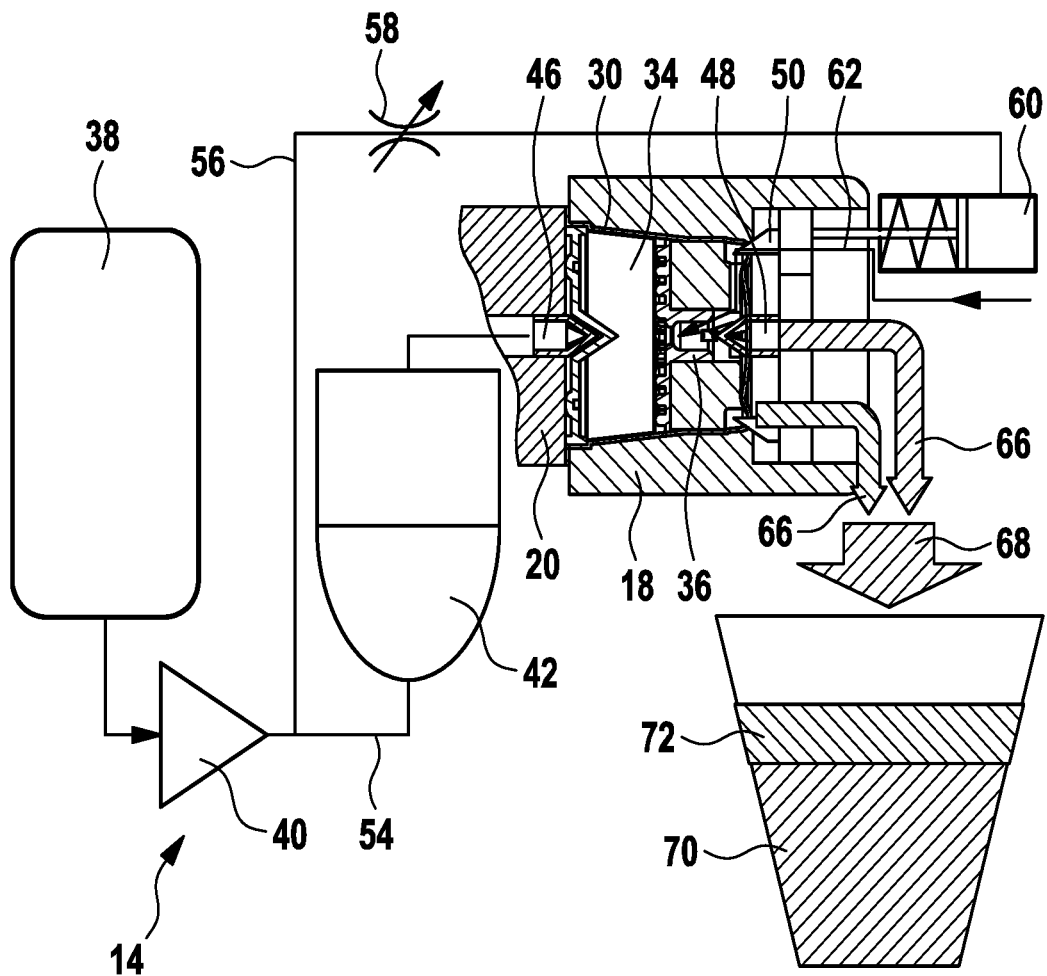
FIG. 3 shows a simplified schematic illustrative block representation of a processing unit, particularly a brewing unit, for a dispenser.

With particular reference to FIG. 3, an exemplary embodiment of a processing unit 14 for a dispenser 10 is illustrated and further described. Generally, the processing unit 14 may be arranged to obtain a beverage or similar foodstuff product 70 (e.g. coffee, milk, etc.) from a to-be-processed consumable 30. It may be desired to create a layer of crema 72 at the top of the foodstuff product 70 to further improve the quality and taste of the foodstuff product 70. To this end, in accordance with the present disclosure, so-called multi-chamber consumables 30 may be utilized. A multi-chamber consumable 30 may comprise more than one distinct internal chamber 34, 36. By way of example, the exemplary consumable 30 illustrated in FIG. 3 may comprise a first chamber 34 and a second chamber 36. The first chamber 34 may contain a food substance 104 from which the foodstuff product 70 may be obtained upon treatment with hot pressurized water. The second chamber 36 may be regarded as processing chamber which may be configured to improve the taste or flavor of the foodstuff product 70.

The consumable 30 may be received at a receiving portion 18 which cooperates with a sealing portion 20 so as to receive the consumable 30 in a sealed manner. The processing unit 14 may comprise a water tank 38 and a pump 40 to pressurize water obtained from the water tank 38. Further, a boiler or heater 42 may be provided to heat up the water. The processing unit 14 may further comprise a primary inlet piercing unit 46, an outlet piercing unit 48 and a secondary inlet piercing unit 50 that are arranged to engage respective portions of the consumable 30. At least one of the primary inlet piercing unit 46, the outlet piercing unit 48 and the secondary inlet piercing unit 50 may be arranged to engage its counterpart portion of the consumable 30 when the receiving portion 18 and the sealing portion 20 are brought into engagement.

Preferably, at least the primary inlet piercing unit 46 and the outlet piercing unit 48 are coupled with the sealing portion 20 and the receiving portion 18, respectively. Basically the same may apply to the secondary inlet piercing unit 50. However, at least in some embodiments at least one the primary inlet piercing unit 46, the outlet piercing unit 48 and the secondary inlet piercing unit 50 may be actuable independently of the sealing portion 20 and the receiving portion 18. To this end, the primary inlet piercing unit 46, the outlet piercing unit 48 and the secondary inlet piercing unit 50 may be coupled with respective actuators. By way of example, as shown in FIG. 3, the secondary inlet piercing unit 50 may be actuable independently of the sealing portion 20 and the receiving portion 18.

The secondary inlet piercing unit 50 may be arranged to establish an auxiliary fluid flow 62 when engaging the consumable 30, particularly an auxiliary air flow. The secondary inlet piercing unit 50 may be coupled to an actuator 60. The actuator 60 may comprise a powered drive, for instance. Similarly, the primary inlet piercing unit 46 and the outlet piercing unit 48 may be coupled to a respective actuator. Primarily for illustrative purposes, FIG. 3 describes an embodiment in which the actuator 60 may be arranged as a hydraulic cylinder that may be coupled to the pressurized fluid system of the processing unit 14. An actuator flow 56 may be established to actuate the actuator 60 and, consequently, the secondary inlet piercing unit 50. The actuator flow 56 may comprise a control valve 58 to control the secondary inlet piercing unit 50. Hence the secondary inlet piercing unit 50 may be operated independently of the primary inlet piercing unit 46 and the outlet piercing unit 48.

However, at least in some embodiments, the secondary inlet piercing unit 50 may be operated basically parallel to the primary inlet piercing unit 46 and the outlet piercing unit 48. Hence, also the secondary inlet piercing unit 50 may be coupled to the receiving portion 18 or the sealing portion 20 to engage the consumable 30 automatically when the consumable 30 is received in the processing unit 14 for the preparation of the foodstuff product 70.

Further, a main inlet flow 54 may be established to supply hot pressurized water via the primary inlet piercing unit 46 to the received consumable 30. The processed foodstuff product 70 may flow out via an outlet pierced by the outlet piercing unit 48 and/or the secondary inlet piercing unit 50, refer to the output flow components 66 that form the overall output flow 68. The output flow 68 may at least partially comprise crema 72 or a similar tasteful bubbly and/or foamy component of the foodstuff product 70.

Figure 4:
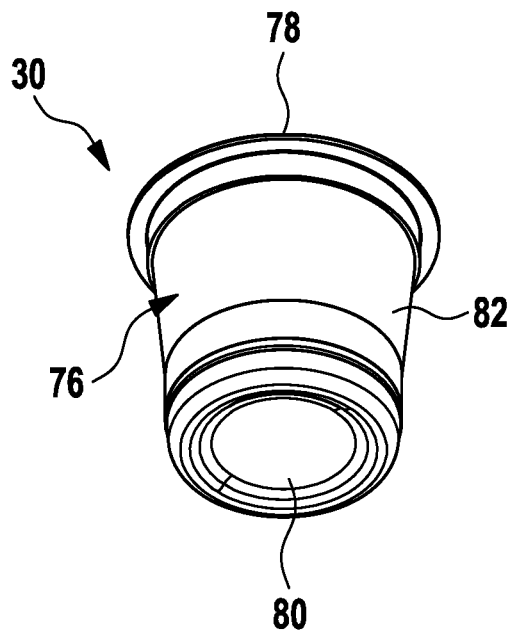
FIG. 4 shows a simplified perspective bottom view of an embodiment of a consumable in accordance with the present disclosure.

Further reference is made to FIG. 4 illustrating a perspective bottom view of a capsule-type consumable 30. As can be further seen from FIGS. 2 and 4, the consumable 30 may comprise a housing 76, particularly a relatively rigid housing 76 at least partially comprising plastic walls and/or aluminum walls that are impermeable to liquid or, more generally, at least substantially impermeable to fluids. At least in some embodiments, the housing 76 may be referred to as sealed housing, particularly a initially sealed housing that is sealed before being processed in the dispenser 10. For the purpose of this disclosure, the consumable 30 may comprise a first end 78 and a second end 80 that is opposite to the first end 78. Between the first end 78 and the second end 80, a rigid wall portion 82 may be provided. As used herein, the term "top" shall refer to the first end 78 of the consumables 30 for illustrative purposes. Further, the term "bottom" shall refer to the second end 80 of the consumables 30 for illustrative purposes. However, this assignment shall be not interpreted in a limiting sense. This is all the more the case since in some dispensers 10 consumables 30 can be received in a particular orientation wherein the first end 78 and the second end 80 of the consumable 30 is not necessarily aligned with the top of the dispenser 10 and the bottom, respectively.

Figure 5:
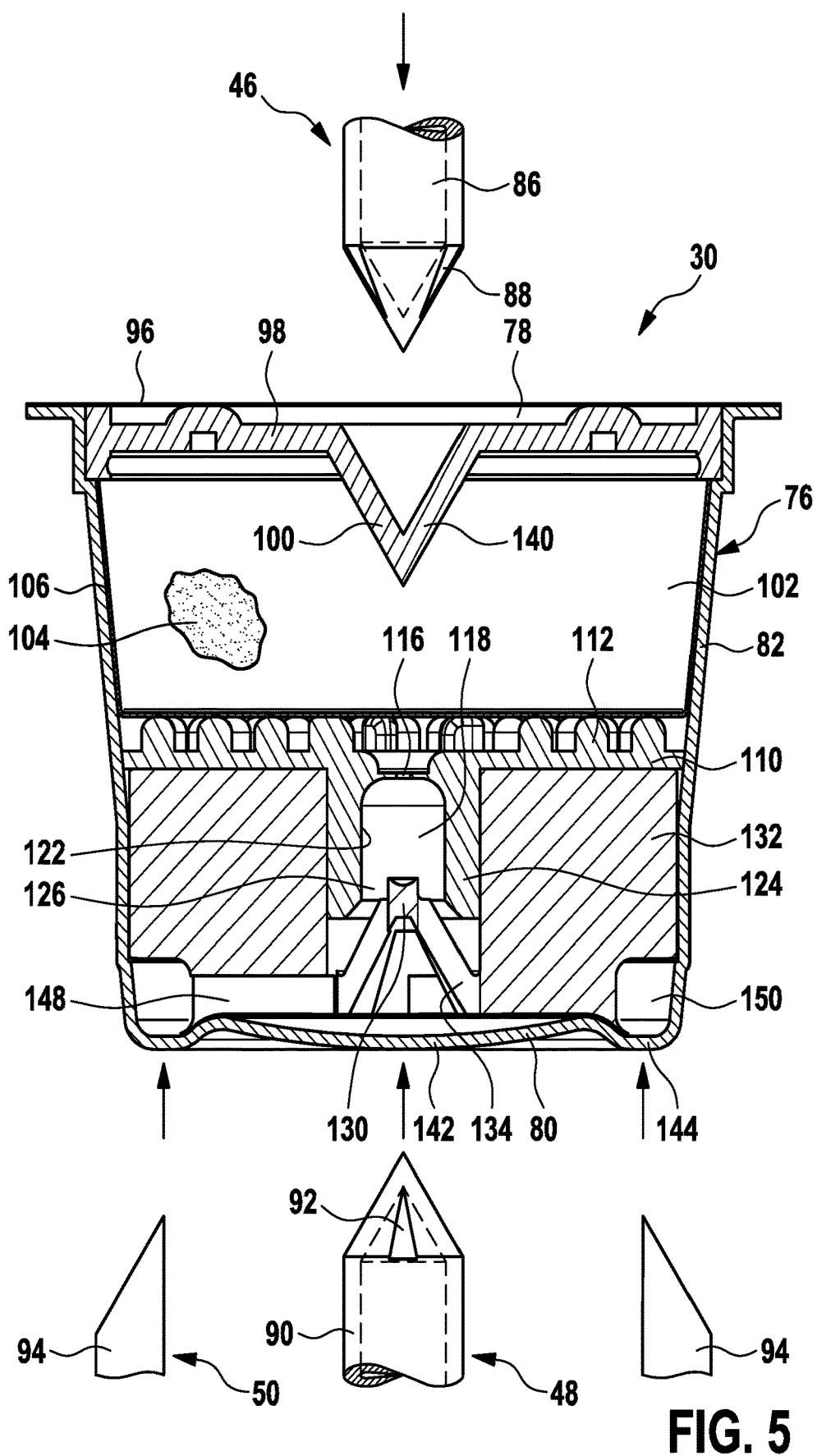
FIG. 5 shows a cross-sectional side view of an embodiment of a consumable in accordance with the present disclosure.
Figure 6:
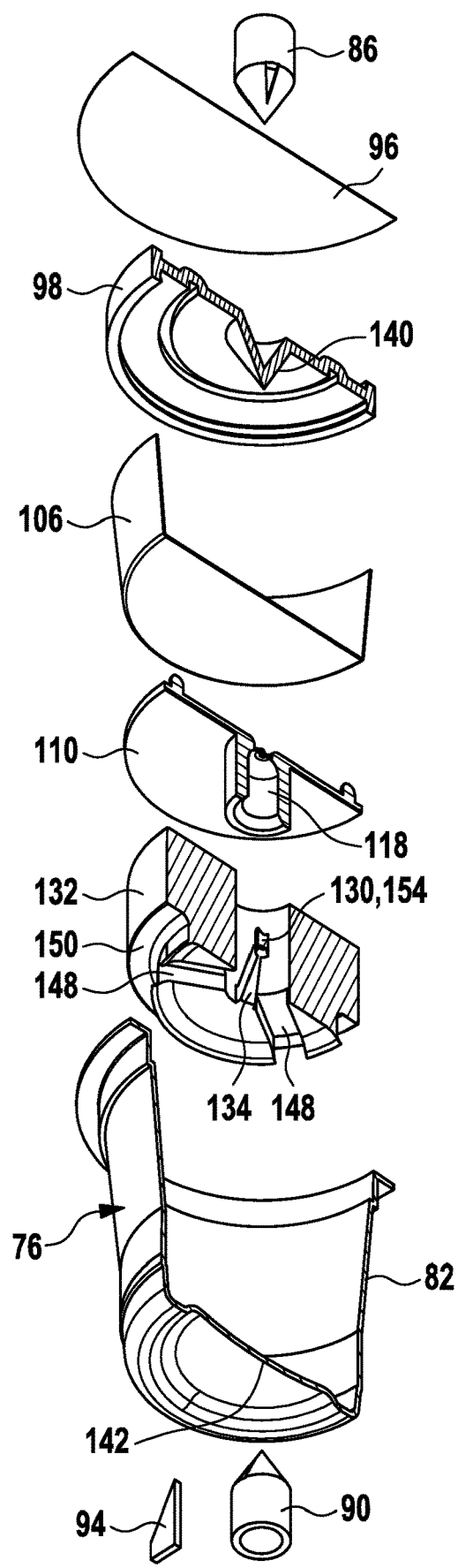
FIG. 6 shows a perspective exploded cross-sectional bottom view of a consumable in accordance with the embodiment shown in FIG. 5.
Figure 7:
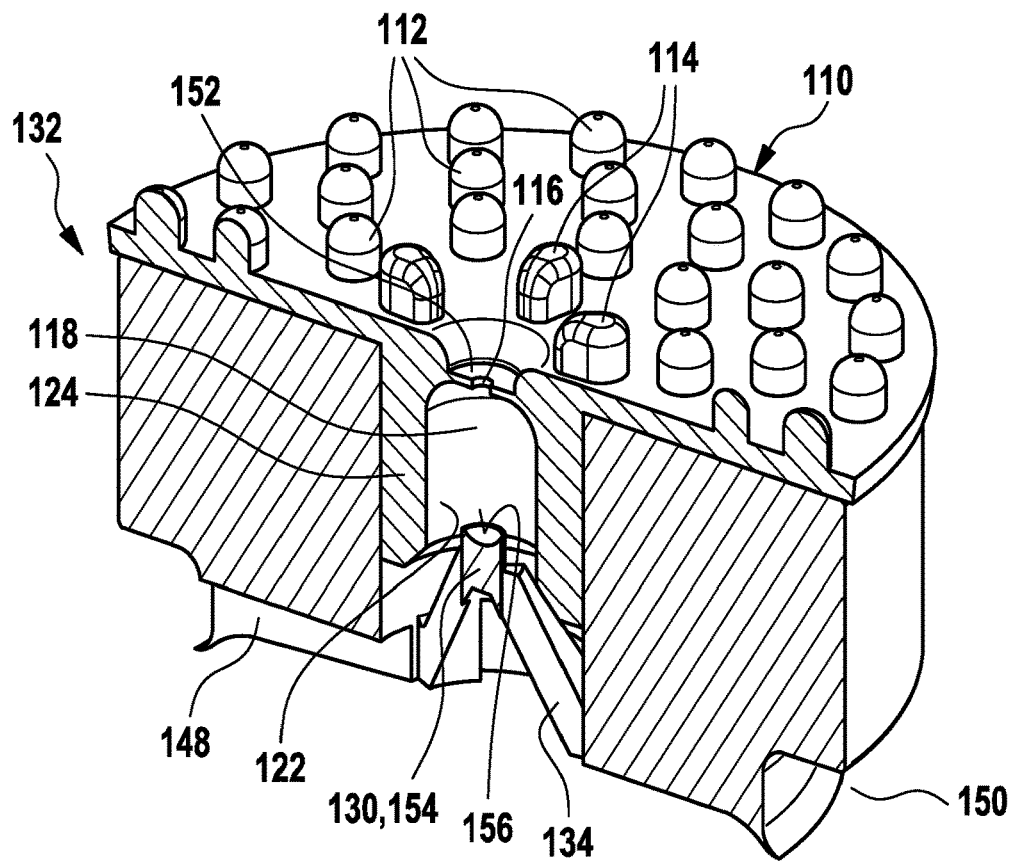
FIG. 7 shows a detailed perspective cross-sectional top view of a flow transfer wall and an insert component in accordance with the embodiment shown in FIG. 5.
Figure 8:
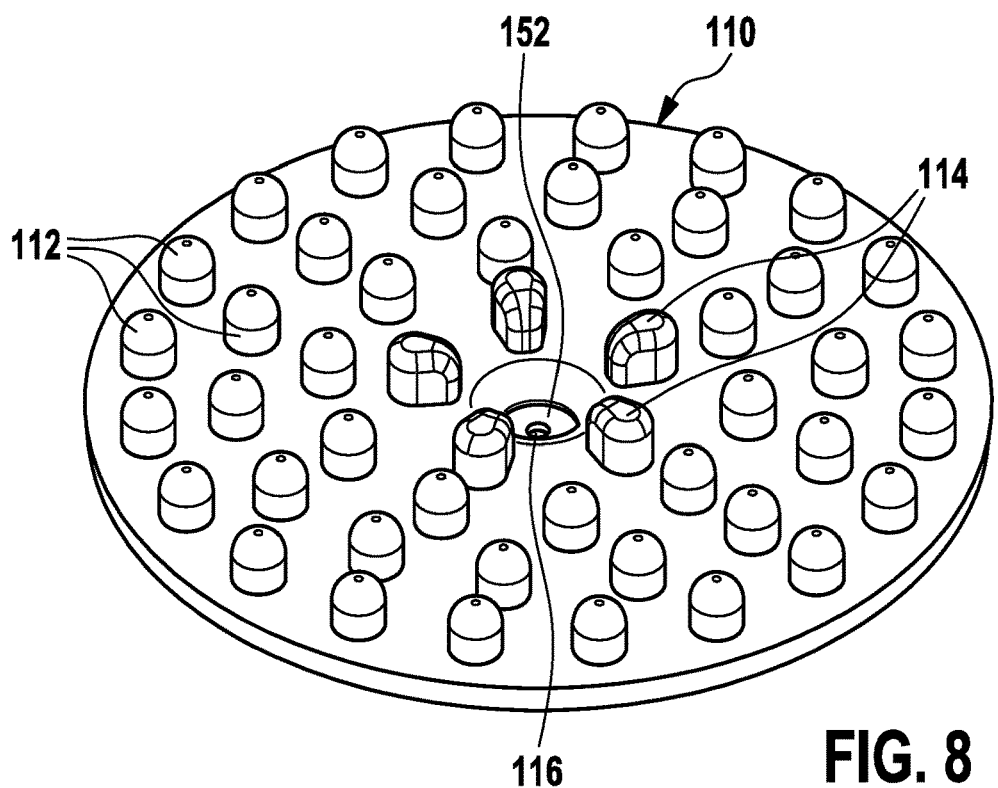
FIG. 8 shows a further detailed perspective top view of the flow transfer wall illustrated in FIG. 7.

With particular reference to FIGS. 5 and 6, and with further reference to FIGS. 7 to 10, an exemplar embodiment of a multi-chamber consumable 30 in accordance with at least some of the principles discloses herein is described.

FIG. 5 is an enlarged cross-sectional view of a consumable 30. FIG. 6 is a corresponding perspective cross-sectional exploded view of the consumable 30. For illustrative purposes, the primary inlet piercing unit 46, the outlet piercing unit 48 and the secondary inlet piercing unit 50 are schematically indicated in FIGS. 5 and 6. Generally, the primary inlet piercing unit 46 may comprise at least one primary inlet piercer 86 or an arrangement of primary inlet piercers 86. Similarly, the outlet piercing unit 48 may comprise at least one output piercer 90 or an arrangement of output piercers 90. Similarly, the secondary inlet piercing unit 50 may comprise at least one secondary inlet piercer 94 or an arrangement of secondary inlet piercers 94. The primary inlet piercing unit 46, the outlet piercing unit 48 and the secondary inlet piercing unit 50 may be arranged at a processing unit 14 of the dispenser 10.

The at least one primary inlet piercer 86 may comprise at least one duct or conduit 88 to enable a fluid flow, particularly a flow of pressurized heated water into the consumable 30. The at least one output piercer 90 may comprise at least one duct or conduit 92 to enable a fluid flow, particularly a foodstuff product flow out of the consumable 30. The at least one secondary inlet piercer 94 may enable an auxiliary inlet fluid flow, particularly an auxiliary air flow.

The consumable 30 comprises a housing 76 that may enclose an inner process or containing volume in a sealed manner. At a first end 78 of the housing 76, a lid or cover 96 may be provided. The first end 78 may cover a top wall or fastening wall 98 of the housing 76. At the fastening wall 98, a conical recess or recess 100 may be provided which may be adapted to the primary inlet piercer 86. Adjacent to the fastening wall 98, a containing chamber 102 may be provided that is adapted to contain a food substance 104. The food substance 104 may be at least partially retained in a filter or filter web 106. As can be seen from FIG. 6, the filter or filter web 106 may comprise a bowl-like shape. However, the filter or filter web 106 may also entirely enclose the food substance 104.

Adjacent to the containing chamber 102, at a defined portion of the housing 76, a flow transfer wall 110 may be provided. In some embodiments, the flow transfer wall 110 may be regarded as an interior separation wall that separates respective chambers 34, 36 of the consumable 30, refer also to FIG. 3. The flow transfer wall 110 may comprise a first surface that faces the containing chamber 102 and a second surface that is facing away from the containing chamber 102. At the first surface, an arrangement of bosses including peripheral bosses 112 and/or center bosses 114 may be provided, refer also to FIGS. 7 and 8. The bosses 112 and the center bosses 114 may define an embossed lifted receiving surface for the filter or filter web 106 that retains the food substance 104.

Hence, sufficient space for guiding a liquid solution obtained from the food substance 104 is provided. The flow transfer wall 110 may further comprise an orifice or flow opening 116 that may be arranged in a central portion thereof. Through the flow opening 116, the foodstuff product 70 may be transferred from the containing chamber 102 to a flow processing chamber 118 that may face the second surface of the flow transfer wall 110. In the flow processing chamber 118, the foodstuff product 70 may be treated to further improve its flavor, quality and appearance.

Generally, the flow opening 116 may be further referred to as flow control member that controls characteristics of a fluid flow that is transferred through the flow opening 116. By way of example, depending on the actual size of the flow opening 116, the pressure of the fluid flow at the outlet side of the flow opening 116 may be defined and/or influenced. A small diameter may cause a relatively high-pressurized outlet flow. A big diameter may cause a relatively low-pressurized outlet flow (i.e. low excess pressure). Besides, the flow opening 116 defines the location, direction and orientation of the output flow.

Consumables 30 and dispensers 10 in accordance with the present disclosure are primarily utilized for the preparation of low-pressure foodstuff products, such as low-pressure coffee, which is in contrast to high-pressure foodstuff products, such as espresso and similar high-pressure types of coffee.

Generally, the flow processing chamber 118 may be configured to process the foodstuff product 70. Consequently, a bubbly or foamy portion of the foodstuff product 70 may be generated. To this end, the flow processing chamber 118 may comprise at least one frothing element. At least in some embodiments, the flow processing chamber 118 may define or comprise a frothing cavity 122. The frothing cavity 122 may comprise a wall portion 124, particularly a cylindrical inner wall portion 124. At an end of the flow processing chamber 118 that is facing away from the flow transfer wall 110, an outlet conduit 126 may be provided. The outlet conduit 126 may be shaped in a basically circular or annular manner. At least in some embodiments, the flow processing chamber 118 may further comprise a frothing member 130 that may be arranged to spray, deflect or stop a liquid jet of a solution obtained from pressurized water and the food substance 104 contained in the containing chamber 102.

Figure 9:
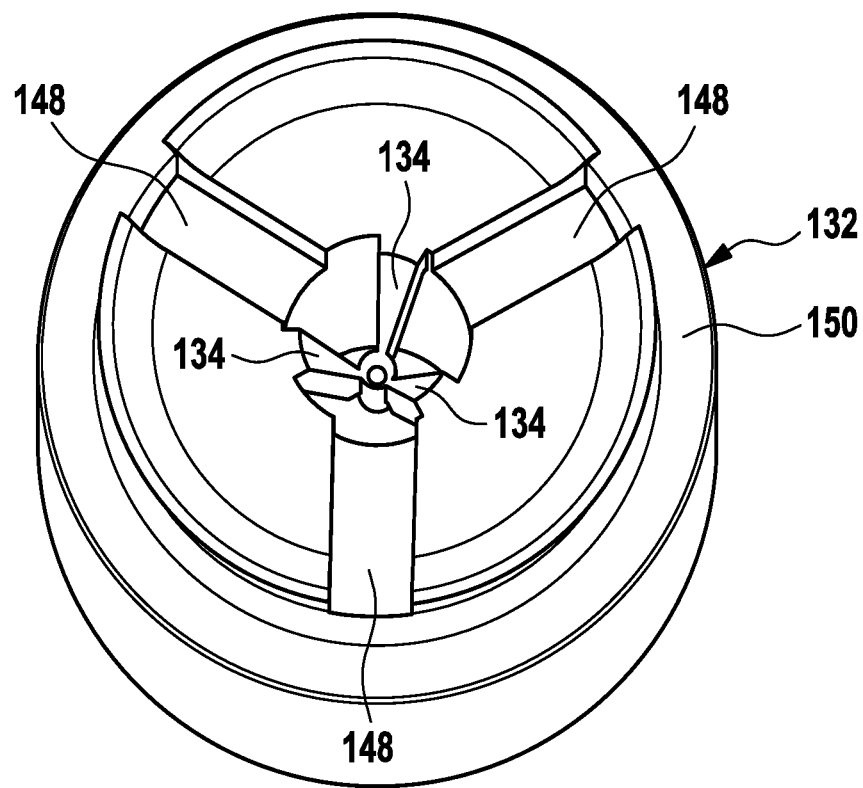
FIG. 9 shows a detailed perspective bottom view of an insert component in accordance with the embodiment shown in FIG. 5.
Figure 10:
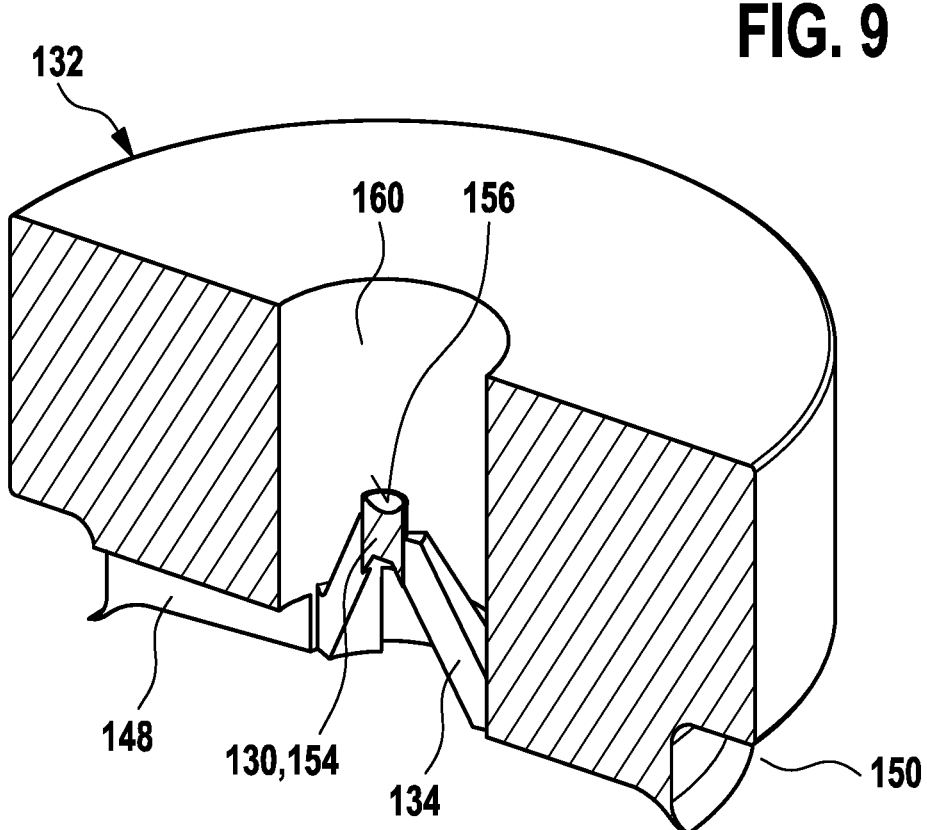
FIG. 10 shows a detailed perspective cross-sectional top view of the insert component illustrated in FIG. 9.

As can be best seen from FIGS. 6, 9 and 10, the frothing member 130 may be received at or attached to an insert component 132. However, in the alternative, the frothing member 130 may be provided as a separate component and/or attached or integrally molded to the flow transfer wall 110. Generally, the insert component 132 may delimit the flow processing chamber 118 or, more particularly, its processing volume. This may significantly influence the frothing process. In other words, the insert component 132 may be utilized to fill a dead volume in the housing 76 of the consumable 30 that is not required for the particular application and/or crema generation. The frothing member 130 may be coupled to the insert component 132 via at least one fastening tab 134. By way of example, three tabs 134 may be provided that are offset by about 120° (degrees).

For interaction with the primary inlet piercing unit 46, the outlet piercing unit 48 and the secondary inlet piercing unit 50, the consumable 30 may comprise respective engagement portions which can be ruptured by respective piercers. At the first end 78, at least one primary inlet portion 140 may be provided. The at least one primary inlet piercer 86 may engage (or: rupture) the primary inlet portion 140. At the second end 80 of the housing 76 at least one outlet portion 142 may be provided. The at least one output piercer 90 may engage (or: rupture) the outlet portion 142. Further, at least one secondary inlet portion 144 may be provided at the housing 76 of the consumable 30. The at least one secondary inlet piercer 94 may engage (or: rupture) the secondary inlet portion 144. By way of example, the secondary inlet portion 144 may be provided at a peripheral zone of the second end 80.

The secondary inlet portion 144 may be coupled to an auxiliary flow channel or path 148 which may take the form of at least one basically radially extending flow channel. As can be seen from FIG. 9, three flow channels may form the auxiliary flow channel or path 148. Further, a peripheral channel 150 may be provided at a peripheral edge that may connect the channels. Basically, the auxiliary flow channel or path 148 and the peripheral channel 150 may be formed at the insert component 132 and delimited by the housing 76. The auxiliary flow channel or path 148 and the peripheral channel 150 may be shaped as indentations at the insert component 132 that are covered by the housing 76. When the at least one secondary inlet piercer 94 of the secondary inlet piercing unit 50 penetrates or ruptures the secondary inlet portion 144, air may enter the peripheral channel 150 and the auxiliary flow channel or part 148 and flow to the flow processing chamber 118 to contribute to the formation of the foamy or crema layer.

With further reference to FIGS. 7 to 10, the flow transfer wall 110, the flow processing chamber 118 and the insert component 132 are described in more detail. As can be best seen from FIGS. 7 and 8, the flow opening 116 may be provided at a deepening or depression 152 at the first side of the flow transfer wall 110 adjacent to the bosses 112 and center bosses 114. Further, the frothing member 130 may comprise an impact head 154 including an impact surface 156 that is configured to face an inlet liquid jet that enters the flow processing chamber 118 through the flow opening 116. The impact surface 156 is preferably concavely curved. In the alternative, the impact surface 156 may be convexly curved and/or planar. Preferably, the impact head 154 may be configured to process (e.g. swirl, atomize and/or spray) the liquid jet. Both the flow transfer wall 110 and the insert component 132 can be made from plastic material, for instance by injection molding the plastic material.

The insert component 132 may further comprise a central hole 160 that is arranged to receive the flow processing chamber 118, particularly the wall portion 124 thereof. Further, the frothing member 130 including the impact head 154 may be formed or molded at the insert component 132. Hence, the insert component 132 and the flow transfer wall 110 may jointly define the frothing cavity 122. Also an outlet conduit 126, particularly an annular outlet conduit 126 may be jointly defined by the wall portion 124 and the impact head 154.

Figure 11:
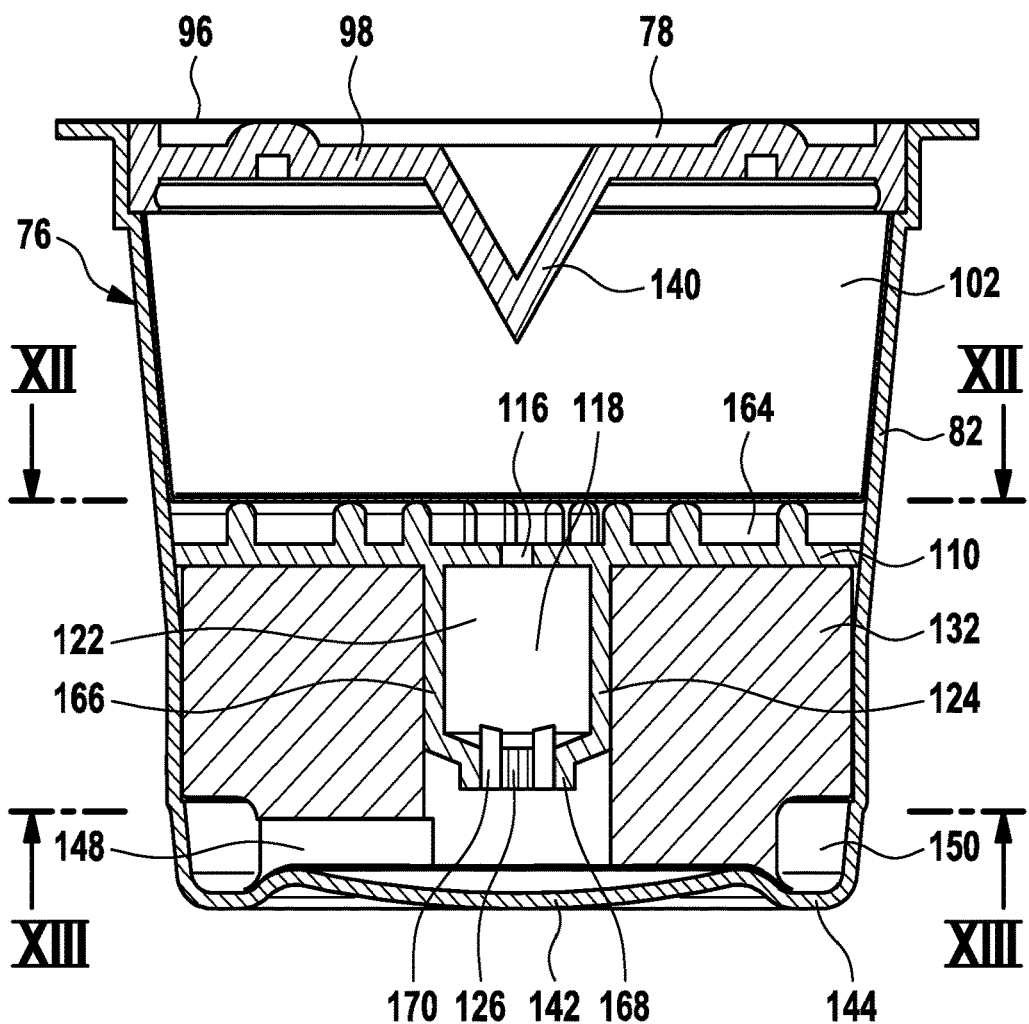
FIG. 11 shows a cross-sectional side view of another embodiment of a consumable in accordance with the present disclosure.
Figures 12, 13:
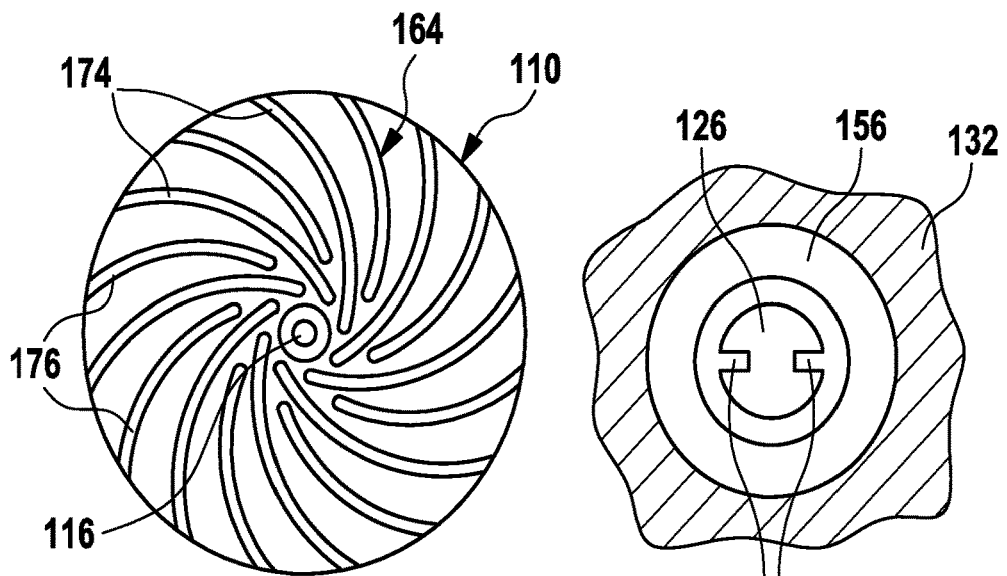
FIG. 12 shows a top view of a flow transfer wall in accordance with the embodiment shown in FIG. 11.
FIG. 13 shows a partial bottom view of a flow processing chamber including a frothing member in accordance with the embodiment shown in FIG. 11.

Further reference is made to FIGS. 11, 12 and 13 which illustrate an alternative embodiment of a consumable 30. The general layout of the consumable 30 shown in FIGS. 11 to 13 basically corresponds to the embodiment illustrated in FIGS. 5 to 10. Generally, like references indicate like components unless otherwise indicated herein. At least slightly different embodiments of the flow processing chambers 118 are illustrated in connection with FIGS. 5 to 10 and FIGS. 11 to 13. With regard to the embodiment of FIGS. 5 to 10, further reference is made to EP 1 694 180 B1. With regard to the embodiment of FIGS. 11 to 13, further reference is made to DE 103 44 328 B4. It is again emphasized that these prior art references relate to pod-shaped soft consumables and respective beverage dispensers. In accordance with the present disclosure, a spraying and/or frothing functionality that can be used for the formation of a tasteful crema layer may be integrated in the consumable 30. Apart from the embodiments explicitly discussed herein, further flow processing and frothing approaches for the formation of foamy crema layers may be envisaged that may be implemented in the consumables 30.

Also the consumable 30 in accordance with FIGS. 11 to 13 comprises a plurality of chambers including a containing chamber 102 and a flow processing chamber 118 that a separated by a flow transfer wall 110. The flow transfer wall 110 of FIG. 11 comprises a pattern of ribs 164 at the first side thereof facing the containing chamber 102. The pattern of ribs 164 may be composed of ribs that may belong to a first rib type 174 and a second rib type 176. The first rib type 174 may be at least slightly longer that the second rib type 176. The first rib type 174 and the second rib type 176 may alternate in a circular curved pattern around the flow opening 116 of the flow transfer wall 110.

Generally, the ribs may extend in a basically radial direction along an at least slightly curved path. The ribs do not end at the flow opening 116 of the flow transfer wall 110 but rather comprise ends that are basically tangential to and/or offset from a central portion of the flow transfer wall 110 where the flow opening 116 is positioned. The pattern of ribs 164 may comprise a basically helical layout, wherein the ribs are basically similarly oriented but angularly offset from each other, refer also to FIG. 12.

The pattern of ribs 164 may induce a spiral flow of a pressurized liquid solution that is based on pressurized heated water and the food substance 104 contained in the containing chamber 102. The flow induced by the pattern of ribs 164 may be regarded as defined twist and/or swirl flow. The liquid flow may traverse the flow opening 116 and enter the frothing cavity 122 of the flow processing chamber 118.

The frothing cavity 122 may comprise a widening zone 166 and a narrowing zone 168 for further processing the liquid flow. The widening zone 166 may be arranged adjacent to the flow opening 116. The widening zone 166 may be basically shaped in a cylindrical fashion. The narrowing zone 168 may be arranged at and include the outlet conduit 126 of the flow processing chamber 118. The outlet conduit 126 may be shaped in a funnel-like fashion. The narrowing zone 168 may further comprise at least one deflecting rib 170, preferably a plurality of deflecting ribs 170. The deflecting ribs 170 may be arranged in the outlet conduit 126 and slightly extend into the flow processing chamber 118, refer also to FIG. 13. The deflecting ribs 170 may be arranged to abruptly deflect and/or stop the fluid flow induced by the pattern of ribs 164. Also in this embodiment, the fluid flow may be sprayed and entrain an auxiliary fluid flow, particularly an auxiliary gas flow. The deflecting ribs 170 may basically extend inwardly in a radial fashion and axially toward the flow opening 116. The deflecting ribs 170 also may be referred to as deflecting and/or spraying tabs.

Figure 14:
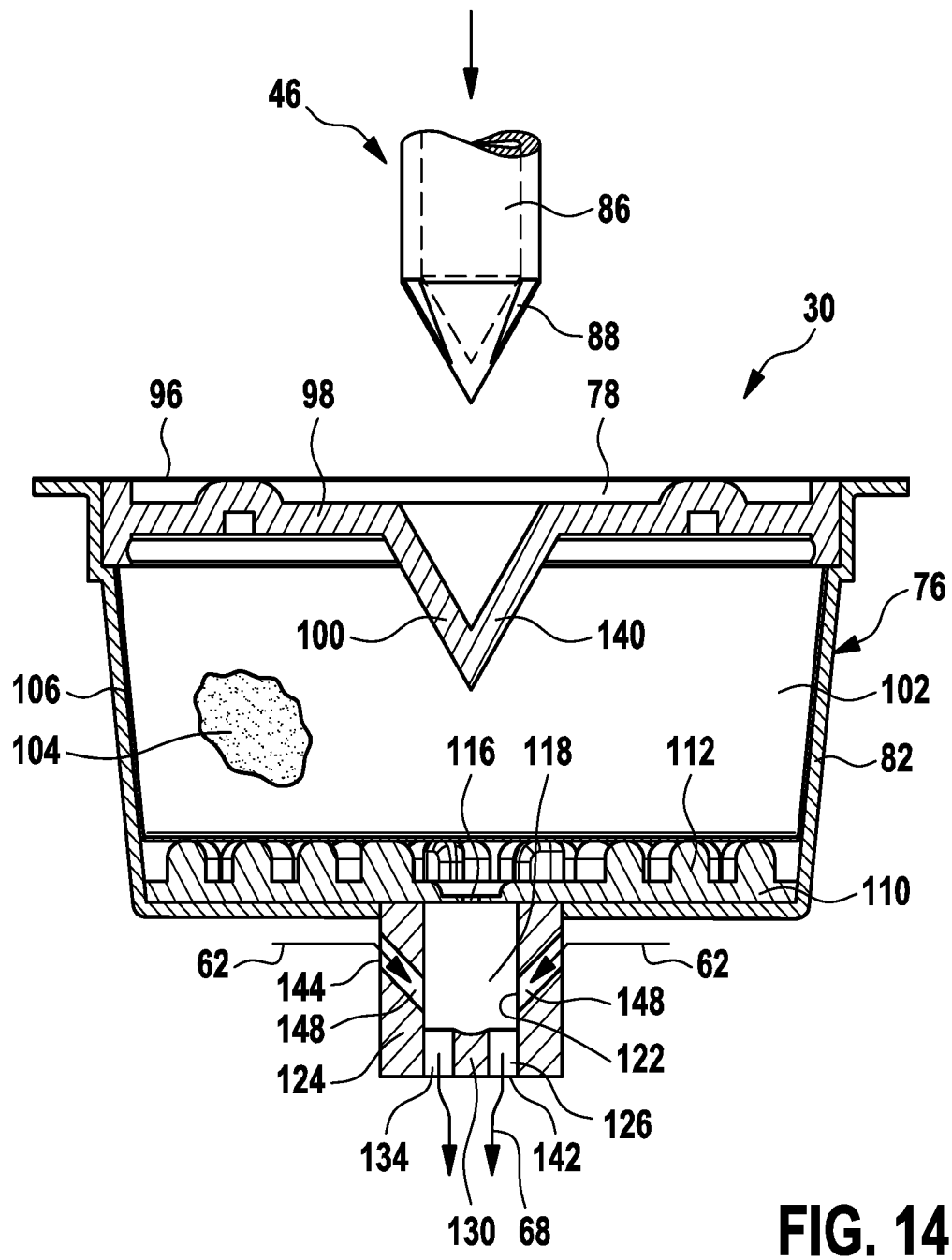
FIG. 14 shows a cross-sectional side view of yet another embodiment of a consumable in accordance with the present disclosure.

Further reference is made to FIG. 14 which illustrates yet another alternative embodiment of a consumable 30. The general layout of the consumable 30 shown in FIG. 14 basically corresponds to the embodiment illustrated in FIGS. 5 to 10. Generally, like references indicate like components unless otherwise indicated herein. The consumable 30 of FIG. 14 basically differs from the embodiment of FIG. 5 in that the housing 76 primarily encloses the containing chamber 102 and in that the flow transfer wall 110 is basically arranged a second end of the housing 76. In other words, the flow processing chamber 118 may be attached or integrally molded to the housing 76 at an outwardly facing portion thereof. This embodiment may have the advantage that no separate insert component (reference number 132 in FIG. 5) is required. Further, since the flow processing chamber 118 is basically freely accessible, there is not urgent need for a respective (actuable) outlet piercer and a respective (actuable) secondary inlet piercer. In other words, the flow processing chamber 118 may be arranged as an extension of the housing 76 that is integrally formed with at least one rigid wall portion 82 of the housing.

With respect to the frothing cavity 122 and the frothing member 130, the embodiment of FIG. 14 may basically correspond to the embodiment of FIGS. 5 to 10. However, the at least one auxiliary flow path 148 illustrated in FIG. 14 is not defined by any insert component. Rather, the at least one auxiliary flow path 148 may be provided in and defined by the wall portion 124 of the frothing cavity 122. Hence, there is not absolute need to impinge or rupture a respective seal. It may be therefore sufficient to receive the consumable 30 of FIG. 14 in a receiving portion 18 (FIG. 3) that merely provides respective flow conduits to engage the secondary inlet portion 144 so as to activate the auxiliary fluid flow 62.

Basically the same may apply to the outlet portion 142 which may also comprise a basically freely accessible outflow or outlet 126. Accordingly, there may be no absolute need to pierce or actively rupture the outlet portion 142. Rather, it may be sufficient to couple an outlet conduit and/or dispenser to the outlet portion 142. Hence, an outlet flow 68 may be established. Generally, the outlet portion of the embodiment illustrated in connection with FIG. 14 may be covered by a cover, lid or film that may seal the outlet side of the consumable 30 (not shown in FIG. 14). The cover may be arranged to be manually and/or automatically removed or ruptured to access the flow processing chamber 118. To this end, a respective outlet engagement unit or outlet piercing unit 48 may be provided. Preferably, also the secondary inlet portion 144 and/or the auxiliary flow path 148 are sealed before the consumable 30 is prepared to be processed. This may be ensured by the same cover, lid or film that may seal the outlet side. However, also separate sealing and/or covering elements may be envisaged that may be likewise manually and/or automatically removed or ruptured to access the consumable 30.

However, at least in some embodiments, also the secondary inlet portion 144 may be provided by the outlet conduit 126. Consequently, it is not necessarily required to provide separate distinct auxiliary flow paths 148. The outlet conduit 126 in accordance with these embodiments may basically provide for both the output flow of the processed foodstuff product and the auxiliary input flow.

Even when the flow processing chamber 118 is attached to an external surface of the housing 76, the flow processing chamber 118 may be an integral component of the (disposable) consumable. A respective embodiment is discussed hereinafter.

Figure 15:
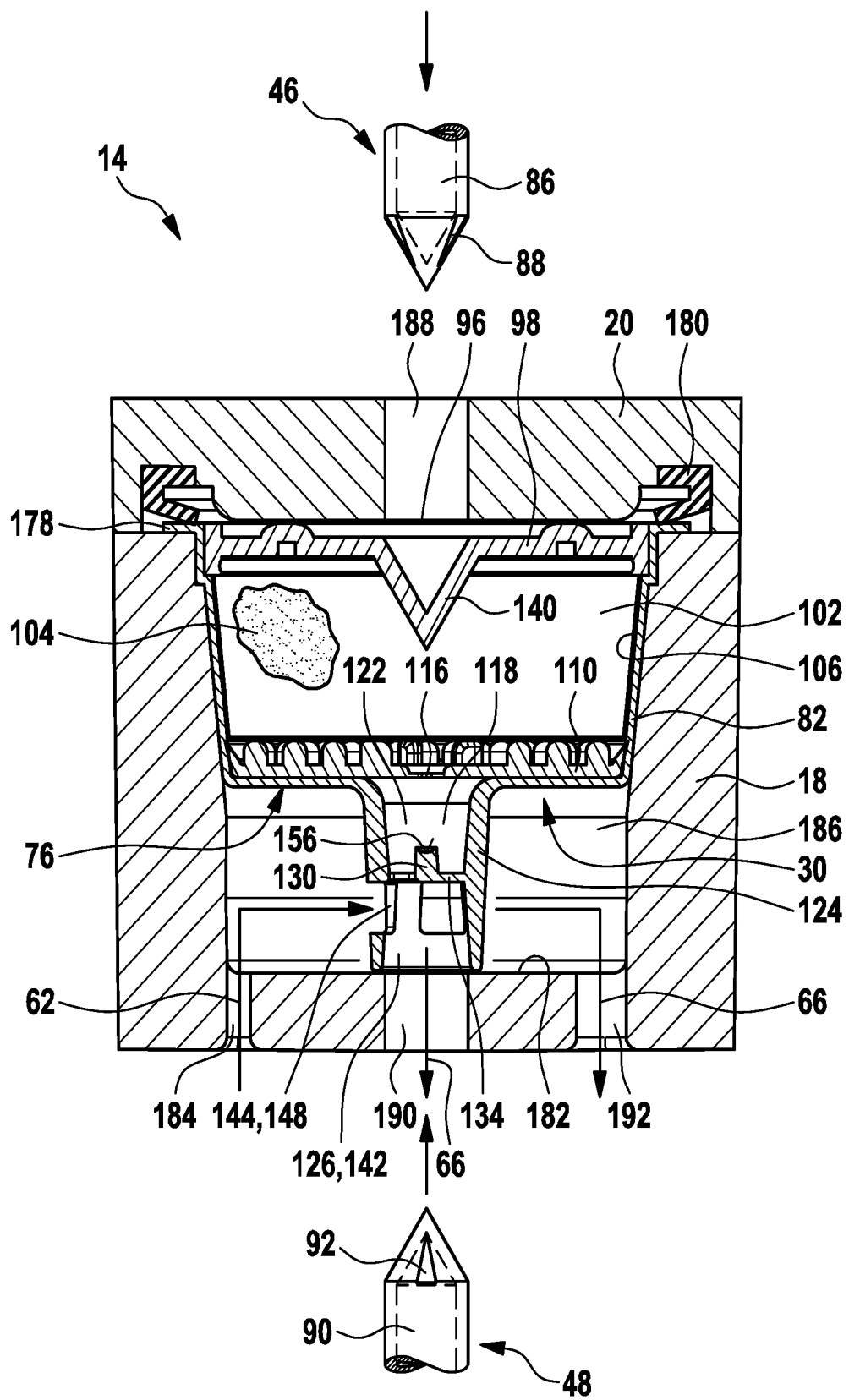
FIG. 15 shows a cross-sectional side view of another embodiment of a consumable in accordance with the present disclosure, the consumable shown in a received state.
Figure 16:
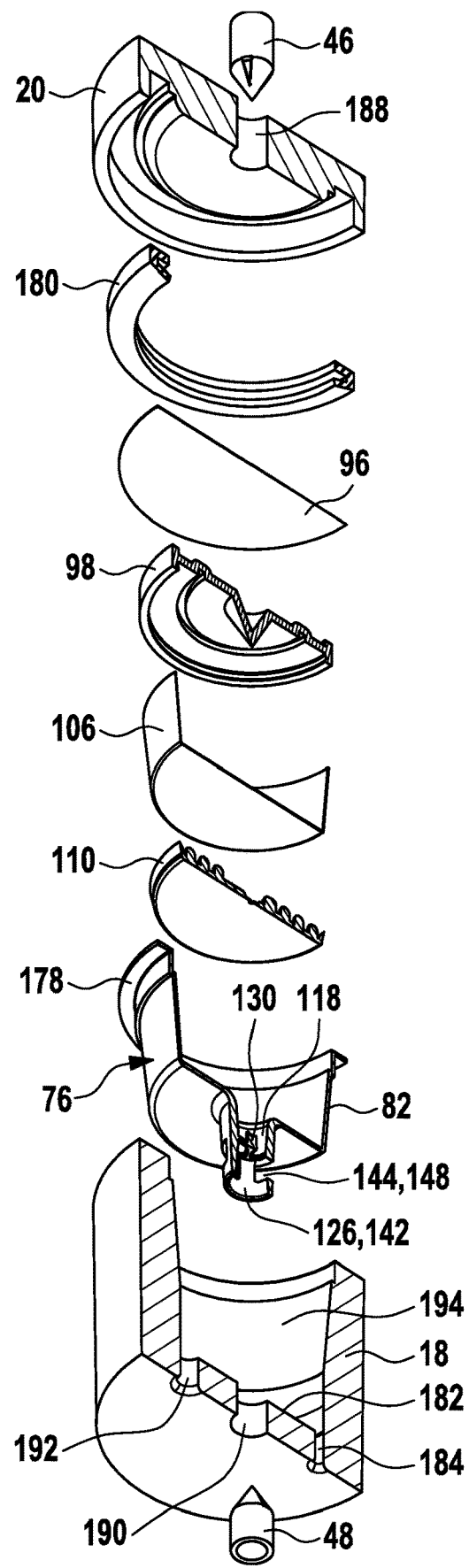
FIG. 16 shows a perspective exploded cross-sectional bottom view of a consumable in accordance with the embodiment shown in FIG. 15.

Further reference is made to FIGS. 15 and 16 which illustrate yet another alternative embodiment of a consumable 30. The general layout of the consumable 30 shown in FIGS. 15 and 16 basically corresponds to the embodiment illustrated in FIG. 14. Generally, like references indicate like components unless otherwise indicated herein. The consumable 30 of FIGS. 15 and 16 basically differs from the embodiment of FIG. 14 in that the flow processing chamber 118 is integrally formed with the housing 76 of the consumable 30. Consequently, the housing 76 encloses the containing chamber 102 and the flow processing chamber 118. Further, the flow transfer wall 110 delimits the flow processing chamber 118. However, since the housing 76 is tightly adapted to the desired shape of the containing chamber 102 and the flow processing chamber 118, no separate insert component (reference number 132 in FIG. 5) is required.

As shown in FIG. 15, the consumable 30 may be received in a processing unit 14, particularly between a receiving portion 18 and a sealing portion 20 thereof. By way of example, a receiving collar 178 of the housing 76 may contact a respective mating receiving region of the receiving portion 18. The receiving collar 178 may be arranged at a first end of the housing 76 of the consumable 30. Further, the receiving collar 178 may be contacted by a tightening element 180, particularly an annular sealing element. The tightening element 180 may be arranged at a respective recess at the sealing portion 20. At least one of the receiving portion 18 and the sealing portion 20 may be actuable to enable an insertion and/or a removal of the consumable 30.

At the receiving portion 18, a receiving ring or support ring 182 may be provided that is arranged to abut and support a respective second end of the consumable 30. More particularly, the support ring 182 may be arranged to contact the outlet portion 142 of the consumable 30 or, more particularly, a boundary wall that encloses the outlet conduit 126. Consequently, the consumable 30 may be received between the receiving portion 18 and the sealing portion 20 is a basically tight-fit or at least slightly biased manner.

Adjacent to the second end of the consumable 30, the housing 76 or, more particularly, the flow processing chamber 118 does not entirely fill a receiving cavity or receiving contour 194 of the receiving portion 18 (refer also to FIG. 16). The receiving cavity 194 may be also referred to as brewing chamber of beverage processing chamber. Consequently, a remaining space 186, particularly an annular space, may be basically unoccupied by the inserted consumable 30 in accordance with the embodiments of FIGS. 14 to 16. However, as can be best seen in FIG. 15, the remaining space 186 may connect respective conduits 184 and 192 that are provided in the receiving portion 18 with the flow processing chamber 118.

A guideway 188 may be provided in the sealing portion 20. The guideway 188 may be arranged to receive and guide the at least one primary inlet engagement unit 46 which may be arranged as a piercing unit. A further guideway 190 may be provided in the receiving portion 18. The guideway 190 may be arranged to receive and guide the at least one outlet engagement unit 48 which may be arranged as a piercing unit. The primary inlet piercing unit 46 may approach and engage the consumable 30 through the guideway 188. The outlet piercing unit 48 may approach and engage the consumable 30 through the guideway 190.

As can be further seen from FIG. 15, at least one secondary inlet portion 144 may be provided at the wall 124 that delimits or defines the flow processing chamber 118 and the outlet conduit 126. The at least one secondary inlet portion 144 may form part of an auxiliary flow channel or path 148 that may be arranged in the vicinity of a frothing member 130. By way of example, the at least one secondary inlet portion 144 may be arranged downstream (in terms of a liquid process flow direction) of the frothing member 130. The at least one secondary inlet portion 144 may be arranged as a conduit or hole in the wall 124.

The receiving cavity or receiving contour 194 may further comprise at least one vent hole or conduit 184. The vent hole 184 may be arranged to enable an auxiliary fluid flow 62, particularly an air flow, into the receiving cavity 194 and, consequently, into the flow processing chamber 118 to process a liquid solution that flows through the flow processing chamber 118. Hence, the vent hole 184 may be operatively connected to the secondary inlet portion 144 of the consumable.

The receiving cavity or receiving contour 194 may further comprise at least one discharge hole or conduit 192. The discharge hole 192 may be arranged to enable an outlet flow component 66 to flow out of the receiving cavity 194. Further, an outlet flow component 66 flow may be enabled by the piercing unit or outlet engagement unit 48 that may be operatively coupled to the outlet conduit 76 of the consumable. However, in the course of processing the liquid foodstuff product, at least a fraction of the output flow may circumvent the outlet conduit 126 and leave the received consumable 30 via the unoccupied remaining space 186 and the discharge hole 192.

Generally, the at least one vent hole 184 and the at least one discharge hole 192 may be shaped in a basically similar manner. The at least one vent hole 184 and the at least one discharge hole 192 may preferably differ in their size, particularly in their diameter. However, at least in one some embodiments, the at least one vent hole 184 and the at least one discharge hole 192 may be used for both the axillary fluid flow 62 and at least an output flow component 66. In some embodiments, the processing unit 14, particularly the receiving portion 18 thereof, may be shaped such that the at least one vent hole 184 is arranged at a higher (vertical) level than the at least one discharge hole 192. By way of example, the receiving portion 18 may be arranged in a basically inclined of lying manner. In other words, a central axis of the receiving portion 18 and/or the consumable 30 does not necessarily have to be perfectly parallel to a vertical axis. Rather, in a lying or sloped configuration, the central axis of the receiving portion 18 and/or the consumable 30 may be considerably inclined or even basically perpendicular with respect to the vertical axis. Consequently, an air flow into the consumable 30 may primarily flow through the (upper) vent hole 184. Further, a liquid (or foamy) output flow component 66 may primarily flow through the (lower) discharge hole 192. However, at least in some embodiments, in practice no perfect separation of an air flow and a liquid flow/foamy flow needs to be achieved.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A disposable consumable for use in a dispenser for preparation of foodstuff products, particularly a beverage, the disposable consumable comprising:
    a housing comprising at least one rigid wall portion that is impermeable to liquid,
    a primary inlet portion arranged to enable pressurized water flow into the housing, when the disposable consumable is inserted in the dispenser,
    a secondary inlet portion arranged to enable an auxiliary fluid flow, particularly an air flow, into the housing, when processing a foodstuff product in the dispenser,
    at least one outlet portion arranged to enable the processed foodstuff product to flow out of the housing,
    at least one containing chamber arranged in the housing, the chamber containing a food substance, particularly a ground substance,
    at least one flow processing chamber arranged to process a liquid solution that flows through the flow processing chamber, the liquid solution being obtained from the food sub stance,
    a flow transfer wall arranged between the containing chamber and the flow processing chamber, the flow transfer wall comprising a defined flow opening that connects the flow processing chamber and the containing chamber,
    wherein a jet of pressurized liquid solution flow enters the at least one low processing chamber through the flow opening,
    wherein the primary inlet portion is connected to the containing chamber,
    wherein the secondary inlet portion is connected to the flow processing chamber such that the auxiliary fluid flow is entrained by a liquid foodstuff flow that flows through the flow processing chamber when processing the foodstuff product, and
    wherein the flow processing chamber comprises at least one frothing member that is arranged to process the jet of pressurized liquid solution flow to create a mist of the liquid foodstuff,
    wherein the at least one frothing member comprises an impact head that comprises an impact surface facing the flow transfer wall.

2. The disposable consumable as claimed in claim 1, wherein the foodstuff product is coffee-based, wherein the food substance comprises ground coffee, and wherein the flow processing chamber is arranged to create a foamy crema layer comprising a mixture of a coffee-based liquid and air bubbles.

3. The disposable consumable as claimed in claim 1, wherein the flow processing chamber comprises a frothing cavity that is arranged at an outlet side of the flow transfer wall facing away from the containing chamber, and wherein the frothing cavity comprises a wall portion and an outlet that defines a basically annular or circular outlet conduit.

4. The disposable consumable as claimed in claim 3, wherein the flow opening of the flow transfer wall is significantly smaller than the outlet conduit of the frothing cavity, and wherein a ratio of an outlet conduit area and a flow opening area is greater than 3:1, greater than 5:1.

5. The disposable consumable as claimed in claim 1, wherein the at least one frothing member is aligned in a direction defined by a central axis of the flow opening.

6. The disposable consumable as claimed in claim 1, wherein the at least one frothing member comprises an impact head that comprises an impact surface facing the flow transfer wall, and wherein the impact head is at least partially spaced from a wall portion of the flow processing chamber, thereby defining an at least partially annular outlet conduit.

7. The disposable consumable as claimed in claim 1, wherein the at least one frothing member comprises a basically annular impact surface arranged between a wall portion of the flow processing chamber and a substantially circular outlet conduit.

8. The disposable consumable as claimed in claim 1, wherein a plurality of bosses is arranged at a side of the flow transfer wall that is facing the containing chamber, and wherein the food substance in the containing chamber is retained by a filter web that abuts the plurality of bosses such that the pressurized liquid solution is allowed to flow through the filter web and directed to the flow opening of the flow transfer wall.

9. The disposable consumable as claimed in claim 1, wherein a circular pattern of ribs is arranged at a side of the flow transfer wall that is facing the containing chamber, wherein the food substance in the containing chamber is retained by a filter web that abuts the circular pattern of ribs such that the pressurized liquid solution is allowed to flow through the filter web and directed to the flow opening of the flow transfer wall, and wherein the pressurized liquid solution is swirled by the circular pattern of ribs.

10. The disposable consumable as claimed in claim 1, wherein the flow processing chamber defines a frothing cavity that is aligned with the flow opening of the flow transfer wall, and wherein the frothing cavity defines a widening zone and, at an end thereof that faces away from the flow opening, a narrowing zone.

11. The disposable consumable as claimed in claim 1, wherein the at least one rigid wall portion of the housing is made from metal material or plastic material and shaped in a basically rotationally symmetric fashion defining a first end associated with the primary inlet portion, and a second end associated with the at least one outlet portion, wherein the flow transfer wall is arranged at the housing, at a center portion of the housing and extends basically perpendicular to a central axis of the housing, and wherein the disposable consumable comprises an insert component that delimits a volume of the flow processing chamber and that is arranged to guide the auxiliary flow to the flow processing chamber.

12. The disposable consumable as claimed in claim 11, wherein the insert component further defines at least one auxiliary flow path between the secondary inlet portion and the flow processing chamber, and wherein the secondary inlet portion is arranged at a region of the housing, an edge region of the housing, that is different from a region where the primary inlet portion is provided.

13. A processing unit for a dispenser for preparation of foodstuff products, the processing unit comprising:

at least a first receiving portion for receiving a consumable, at least a first sealing portion that cooperates with the at least a first receiving portion to receive the consumable in an at least partially sealed manner, wherein at least one of the first receiving portion and the first sealing portion is actuable to insert and remove the consumable, a primary inlet engagement unit that is coupled to an inlet conduit through which pressurized water can be provided, wherein the primary inlet engagement unit is operable to engage a primary inlet portion of the consumable to process a foodstuff product in the consumable, an outlet engagement unit that is operable to engage an outlet portion of the consumable to enable the processed foodstuff product to flow out of the housing, a secondary inlet engagement unit that is operable to engage a secondary inlet portion of the consumable to enable an auxiliary fluid flow, particularly an air flow, into the consumable when processing the foodstuff product, wherein the auxiliary fluid flow is entrained by a liquid foodstuff flow that flows through a flow processing chamber of the consumable when processing the foodstuff product, and wherein a jet of pressurized liquid solution flow enters the at least one flow processing chamber through the flow opening, wherein the flow processing chamber comprises at least one frothing member that is arranged to process the jet of pressurized liquid solution flow to create a mist of the liquid foodstuff, wherein the at least one frothing member comprises an impact head that comprises an impact surface facing the flow transfer wall.

14. The processing unit as claimed in claim 13, wherein at least one of the primary inlet engagement unit and the outlet engagement unit comprises a piercer that is provided with an internal conduit through which a fluid flow may be transferred.

15. The processing unit as claimed in claim 13, wherein the secondary inlet engagement unit is selectively actuable to enable the auxiliary fluid flow into the consumable.

* * * * *